Figures 1, 2:
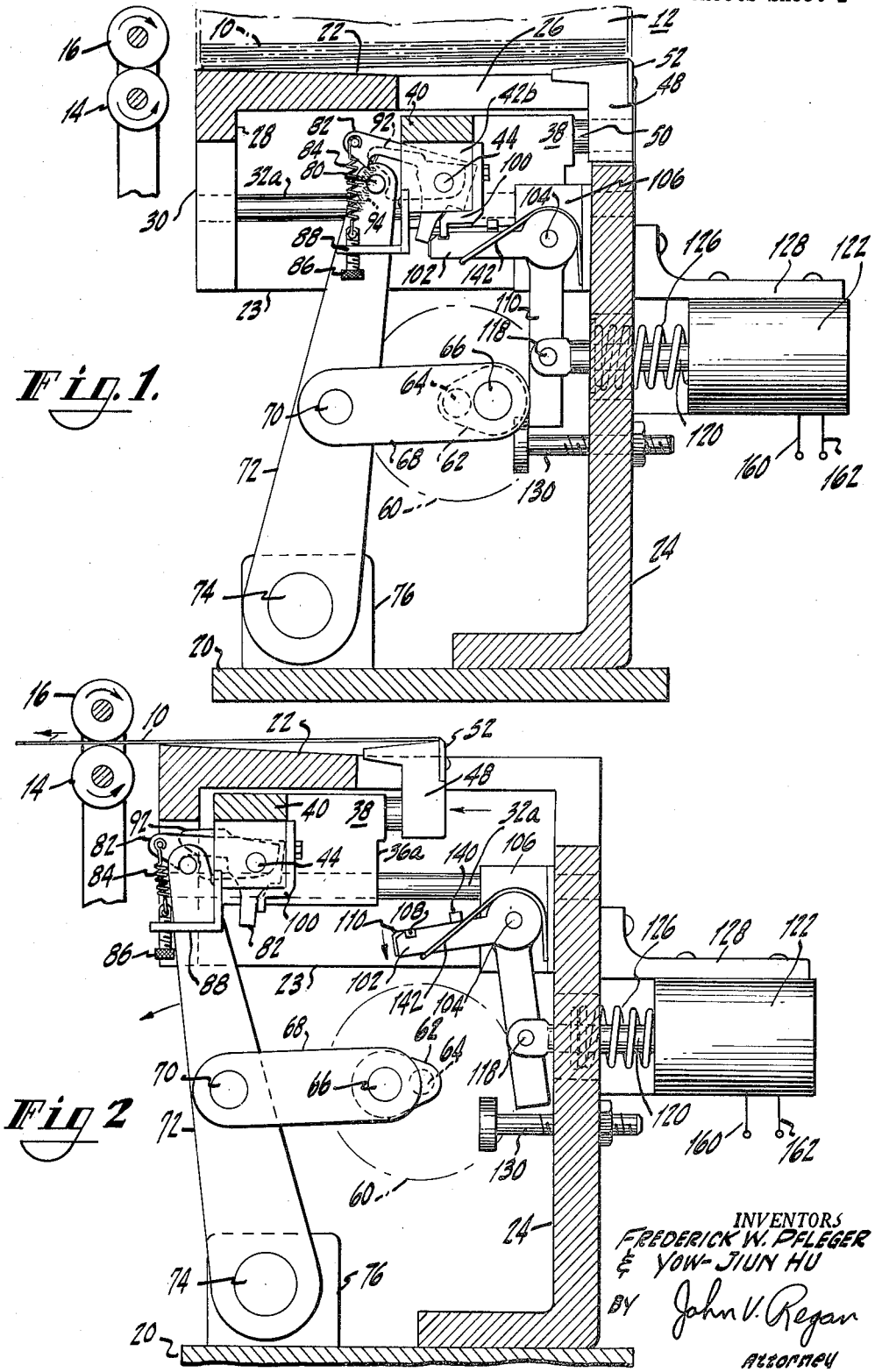

April 12, 1966 F. W. PFLEGER ETAL 3,245,682
COMMAND FEED MECHANISM
Original Filed Jan. 23, 1961 2 Sheets-Sheet 1

INVENTORS
FREDERICK W. PFLEGER
& YOW-JIUN HU
BY John V. Regan
ATTORNEY

April 12, 1966 F. W. PFLEGER ETAL 3,245,682
COMMAND FEED MECHANISM
Original Filed Jan. 23, 1961 2 Sheets-Sheet 2

INVENTORS
FREDERICK W. PFLEGER &
BY YOW-JIUN HU
John V. Regan
Attorney

United States Patent Office 3,245,682
Patented Apr. 12, 1966

3,245,682
COMMAND FEED MECHANISM
Frederick W. Pfleger, Camden County, N.J., and Yow-jiun Hu, Fairfax County, Va., assignors to Radio Corporation of America, a corporation of Delaware
Continuation of application Ser. No. 84,440, Jan. 23, 1961. This application Feb. 10, 1964, Ser. No. 344,168
8 Claims. (Cl. 271—44)

This invention relates in general to mechanisms for feeding objects on command from a supply station and, more particularly, to a new and improved mechanism for feeding statistical record cards, or the like, on command. This application is a continuation of our pending application, Serial No. 84,440, filed January 23, 1961.

It is an object of this invention to provide an improved feed mechanism wherein the feeder assembly is held in a stationary position when not feeding, without disturbing the input motion, thereby eliminating unnecessary wear of the feed mechanism without disrupting the timing system of the user machine.

It is another object of this invention to provide an improved feed mechanism wherein engagement and disengagement of the feeder assembly occur only at the beginning of an input drive cycle, regardless of the time of arrival of an operating command. This feature provides the following advantages, which may be considered further objects of the invention:

(a) Engagement and disengagement of the feeder assembly occur at minimum velocity of the input drive, thereby reducing wear and shock of the feed mechanism.

(b) Inertia of start-stop components is reduced.

(c) The need for clutches, gears and special cams is obviated.

(d) Operation of the feed mechanism cannot be interrupted during a drive cycle.

(e) The feeder assembly is disengaged from the input drive and locked in a non-feeding position automatically at the end of input drive cycle if the operating command is interrupted during the cycle.

It is a further object of the invention to provide a command feed mechanism which can be programmed to meet various timing requirements.

These and other objects of the invention are accomplished by the combination of a movable feeder device or assembly having a home position, a latch pin movable continuously between a first position corresponding to the home position aforesaid and a second position, a latch pivotally mounted on the feeder device for selectively engaging the latch pin, bias means urging the latch into a pin engaging position, a holding member for engaging and holding the feeder device in its home position and for simultaneously pivoting the latch out of the pin engaging position, and means operable on command for selectively moving the holding member out of engagement with the feeder device and the latch. The holding member preferably comprises a solenoid-actuated, pivotally mounted linkage having a notch or recess for receiving a catch projecting from the feeder device.

Figure 3:
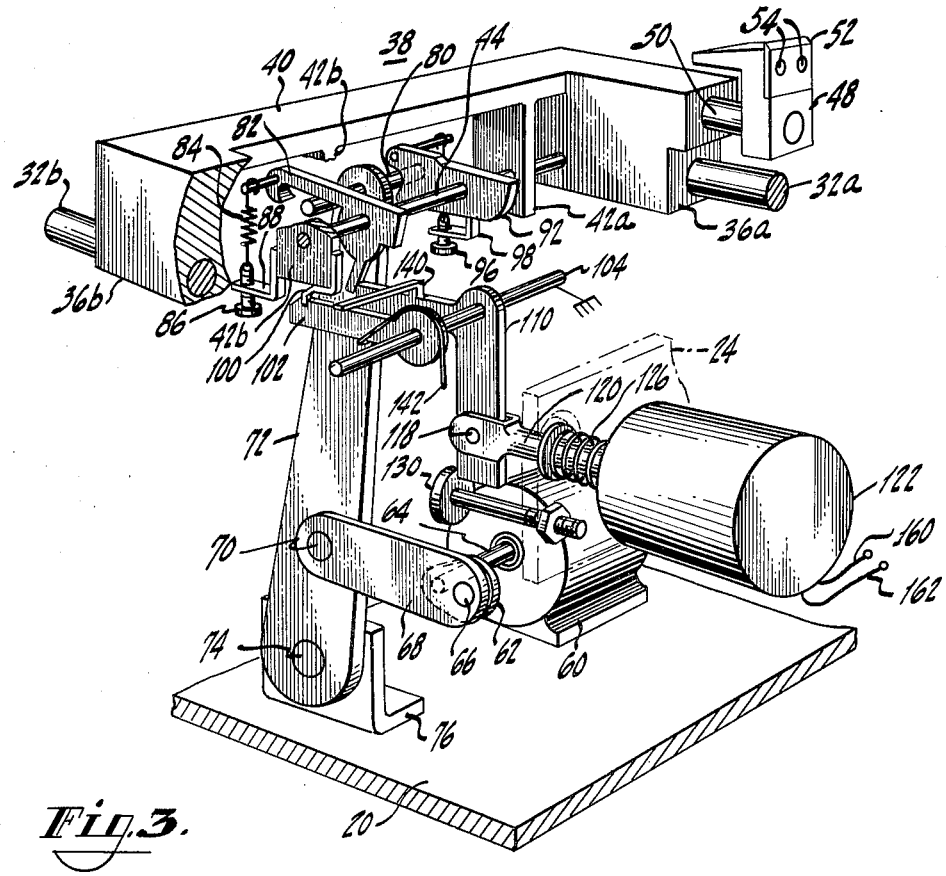

In the accompanying drawing, like reference characters refer to like components, and:

FIGURE 1 is a side elevational view of the feed mechanism, in vertical section, wherein the input drive means is positioned at one end of its travel, and wherein the feeder assembly is disengaged from the input drive and in its "home" position;

FIGURE 2 is another side elevational view of the feed mechanism, in vertical section, wherein the input drive means is positioned at the other end of its travel, and wherein the feeder assembly is in engagement with the input drive means; and FIGURE 3 is a perspective view of the feeder assembly, holding means and input drive means, there being certain portions thereof shown in section for the purpose of providing detailed disclosure.

The feeder mechanism of the present invention may be used to feed, on command, any of various types of objects from a storage location. In particular, the mechanism may be used to feed statistical record cards 10, on command, from an input hopper 12 to a pair of feed rollers 14, 16, and will be so described hereinafter.

Referring to FIGURES 1 and 2, the mechanism is supported by a frame structure which includes a base 20, a top plate 22, and a partial, far side wall 23, and a rear wall 24 for supporting the top plate 22 in vertically spaced relation to the base 20. The top plate 22 has cutout portions defined by walls 26. Picker knife assemblies, to be described, translate to and fro in the cutouts along a horizontal plane from right to left and back as viewed in the drawing. The top plate 22 has a bifurcated portion 28 extending vertically downward from the left end thereof, forming two spaced-apart arms 30 which are parallel to the rear wall 24. Each of the arms 30 has an aperture therein for receiving one end of a different, horizontal shaft 32a or 32b. The other ends of the shafts 32a, 32b fit into apertures in the rear wall 24, the apertures being arranged so that the shafts 32a, 32b are parallel to each other.

The horizontal shafts 32a, 32b also project through apertures in side arms 36a, 36b, respectively, of a movable carriage 38. The carriage 38, which may best be seen in FIGURE 3, is adapted to slide back and forth on the shafts 32a, 32b on ball bushings (not shown). The carriage 38 includes a top crosspiece 40 connecting the side arms 36a, 36b and integral with portions thereof. A second pair of arms 42a, 42b extends vertically downward from the crosspiece 40 and between the side arms 36a, 36b. A portion of the vertical arm 42b is broken away in FIGURE 3 for clarity of drawing. The arms 42a, 42b support a rod 44 on which certain parts of the feed mechanism are pivotally mounted. A substantially L-shaped picker knife mount 48 is attached to the side arm 36a, at the rear end thereof, by means of a shoulder bolt 50. A picker knife 52 is secured to the picker knife mount 48 by means of screws 54, rivets, or the like. The shoulder bolt 50 permits slight pivoting, or rotary movement of the picker knife mount about a horizontal axis, whereby the picker knife 52 may adjust its position squarely to meet the edge of the card 10 even if the card is slightly canted. A similar picker knife assembly (not shown) is attached at the rear end of the other side arm 36b. The rear portion of the side arm 36b is cut away in FIGURE 3 for clarity of drawing.

The carriage 38 is located beneath the top plate 22, which may serve as a supporting table for the card hopper 12 (FIGURE 1) and the stack of record cards 10. The picker knife assemblies project above the top of the top plate 22 at the right end thereof, and the picker knife mounts 48 support the record cards 10 at the right end, as viewed in the drawing. The top plate 22 slants upward slightly at the forward end so that the cards 10, whether warped or flat, always make contact with the picker knives.

A motor 60, shown in full in FIGURE 3 and in phantom in FIGURES 1 and 2, supplies drive power for the feed mechanism. The motor 60 also may drive one of the feed rollers 14, 16 by means of a pulley and belt (not shown) and may furnish input drive to the user machine (not shown). A tear-drop shaped web 62 is mounted on the end of the motor shaft 64. A crank pin 66 is connected eccentrically to the web 62 at a point displaced from the motor shaft 64. This crank pin 66 moves in a circular path as the web 62 is rotated by the shaft 64. A crank link 68 has one end connected to the crank pin 66 and is pivotally attached at the other end to a drive link 72. One end of the drive link 72 is pivotally mounted on a pin 74 secured to a bracket 76. The bracket 76 is secured to the base 20. The end of the crank link 68 pinned at crank pin 66 moves eccentrically when driven by the shaft 64 and causes the drive link 72 to oscillate to and fro from right to left, as viewed in FIGURES 1 and 2. A latch pin 80 projects from either side of the drive link 72 at the upper end thereof (FIGURE 3), and traces a curvilinear path between a first position (FIGURE 1), corresponding to the "home" position of the carriage 38, and a second position (FIGURE 2), as the drive link 72 oscillates back and forth. The latch pin 80 has a first surface portion facing in the direction of the "home" position, and a second surface portion facing in the direction of the second position.

An L-shaped latch member 82 is pivotally mounted on the rod 44 carried by the vertical arms 42a, 42b of the carriage 38. The left end of the latch member 82 is hook-shaped for engaging the forward, or second surface portion of the latch pin 80. A spring 84 urges the latch member 82 counterclockwise into a pistion whereat it may engage the pin 80. This position is termed hereinafter the "pin engaging position." One end of the spring 84 is connected to the latch member 82. The other end of the spring 84 is connected to an adjustable screw 86 carried by a bracket 88 mounted on the vertical arm 42b. A stop member 92 also is pivotally mounted on the rod 44 between the arms 42a, 42b. The forward end of the stop member 92 is recessed for sure engagement with the first surface portion latch pin 80. This stop member 92 is urged in a counterclockwise direction by a spring 94 (FIGURE 1) connected to an adjustable screw 96 (FIGURE 3). The screw 96 is carried by a bracket 98 secured to the forward end of the vertical arm 42a. An adjustable screw 90 through the crosspiece 40 limits the counterclockwise rotation of the stop member 92. The drive link 72 oscillates back and forth in a vertical plane which is parallel to, and approximately midway between, the parallel, vertical planes through the latch member 82 and the stop member 92. It will be apparent to those skilled in the art that if desired the latch member 82 and the stop member 92 could be formed as a single unit.

The carriage 38 normally is held in a stationary, or "home," position as follows. A catch 100 is rigidly secured to the vertical arm 42b. A carriage latch 102, pivotally mounted on a pivot pin 104, has a notch 108 for engaging and holding the free end of the catch 100. The pivot pin 104, in turn, is fixedly held by a block 106 secured to the rear wall 24 of the supporting frame (FIGURE 1). A linkage 110 also is pivotally mounted on the pivot pin 104, and has one end holding the latch member 82 cocked in a clockwise direction when the catch 100 is fixedly held by the carriage latch 102. The other end of the linkage 110 is connected by a pin 118 to the plunger 120 of a solenoid 122. The solenoid 122 is secured to a bracket 128 mounted on the outside of the rear wall 24, and the plunger 120 projects through an aperture in the rear wall 24. A compression spring 126 surrounds the plunger 120 and urges the linkage 110 in a clockwise direction when the solenoid is de-energized. An adjustable stop member comprising a screw 130 limits the clockwise rotation of the linkage 110. The carriage latch 102 and the pivotable linkage 110 may consist of a single integrated member or may consist of two separate members, as shown. In the latter case, an arm 140 projecting transversely from the pivotable linkage 110 is provided for rotating the carriage latch 102 in a counterclockwise direction when the solenoid 122 is energized. A spring 142 urges the carriage latch in a clockwise direction.

Consider now the operation of the feed mechanism, and refer first to FIGURE 1. The carriage 38 is shown in a stationary, non-feeding position in FIGURE 1. This position is referred to hereinafter as the "home" position of the carriage. The solenoid 122 is de-energized at this time, and the pivotable linkage 110 is cocked clockwise in the position shown (which position is determined by the setting of the stop screw 130) by the force of the compression spring 126. The carriage latch 102 has been rotated clockwise, and is held in the position shown, by the spring 142. The catch 100, secured to the vertical arm 42b, is held by the carriage latch 102; the lower end of the catch 100 then projects into the notch 108. The position of this notch with respect to the pivot pin 104 is such that, when the carriage is in its extreme right hand position, the lower end of the latch member 82 abuts against the left end of the linkage 110. Therefore, the latch member 82 is cocked in its most clockwise position, out of the path of the latch pin 80.

The motor 60 runs continuously, and the drive link 72 oscillates back and forth in response to the input drive imparted by the crank link 68. The latch pin 80 at the upper end of the drive link 72 traces a curvilinear or arcuate path. The carriage 38 assembly, or feed assembly, remains in the "home" position because (1) the catch 100 is held by the carriage latch 102, and (2) the latch member 82 is cocked or held out of the path of travel of the latch pin 80. The angular displacement of the drive link 72 preferably is selected, by proper choice of the web 62 and the position of the connecting pin 70; so that the latch pin 80 has the position illustrated in FIGURE 1 when the drive link 72 is in its most clockwise position. The drive link 72 and the latch pin 80 have zero volocity at this time, and the position of the latch pin 80 illustrated in FIGURE 1 may be termed the "home" position of the latch pin 80. It is thus seen that the feeder assembly is held stationary when not feeding, without disturbing the input motion. This maintains the timing system of the user machine and eliminates unnecessary wear of the feeder.

The feeder assembly is selectively engaged, on command, in response to an energizing signal supplied to the solenoid 122 over the input lines 160, 162. When the solenoid 122 becomes energized, the plunger 120 is pulled into the solenoid against the force of the compression spring 126. This condition is illustrated in FIGURE 2. The linkage 110 is rotated in a counterclockwise direction by the solenoid plunger 120 an amount sufficient to release the latch member 82. The arm 140 on the linkage 110 causes the carriage latch 102 to rotate in a counterclockwise direction out of engagement with the catch 100. The latch member 82 then pivots counterclockwise into a latch pin engaging position under the urging force of the bias spring 84. The hook-shaped end of the latch member 82 now engages the latch pin 80 when the latch pin 80 is moved to its "home" position. Thus, as the latch pin 80 approaches its "home" position, it contacts the forward edge of the latch member 82 and causes the latch member 82 to ride up on the latch pin 80. The latch member 82 drops down into positive engagement with the latch pin 80 when the pin 80 reaches its "home" position.

The carriage 38 assembly translates to the left, under the force imparted to the latch member 82 by the latch pin 80, as the latch pin 80 moves from right to left. The picker knife 52 engages the edge of the bottom record card 10 as the carriage 38 is moved from the "home" position, and pushes the card 10 to the left. The rollers 14, 16 grab the record card 10 after it has moved from the input hopper 12. These rollers 14, 16 preferably are positioned to grab the card 10 when the card 10 is moving with maximum velocity. The card 10 has its maximum velocity when the drive link 72 is in the vertical position.

The carriage 38 assembly and latch pin 80 are illustrated in FIGURE 2 in their leftmost position, corresponding to the point of maximum counterclockwise rotation of the drive link 72. The latch pin 80, the upper end of the drive link 72 and portions of the carriage 38 assembly then project into the space between the arms 30 of the bifurcated member 28. The carriage 38 assembly then translates to the right, under the force imparted on the stop member 92 by the latch pin 80, as the arm 72 rotates clockwise and the latch pin 80 moves to the right. The horizontal shafts 32a, 32b guide the carriage 38. The latch member 82 and the stop member 92 act as a floating link to translate or convert the curvilinear motion of the latch pin 80 into linear motion of the carriage 38.

A separate card 10 is fed from the hopper 12 to the rollers 14, 16 each time the latch pin 80 moves from right to left, assuming that the solenoid 122 is energized. The card feeding operation is terminated by removing the energizing signal from the solenoid 122. However, the card feed operation does not terminate until completion of the feed cycle then in progress, regardless of the time of removal of the energizing signal with respect to the feed cycle. The positive engagement of the latch member 82 and stop member 92 with the latch pin 80 prevents disengagement of the carriage 38 assembly from the input drive until the carriage 38 is returned to its "home" position (FIGURE 1). This feature provides a fail safe function in the event of signal interruption.

The compression spring 126 forces the plunger 120 out of the solenoid 122 when the solenoid 122 becomes de-energized. The linkage 110 then is rotated clockwise about the pin 104 to the position shown in FIGURE 1. The spring 142 rotates the carriage latch 102 clockwise into contact with the transverse arm 140. As the carriage 38 assembly nears its "home" position, the catch 100 contacts the forward, sloped end of the carriage latch 102 and forces the carriage latch 102 in a counterclockwise direction. The catch 100 rides on the upper surface of the carriage latch 102 until it reaches the notched portion 108. The carriage latch 102 then rotates clockwise under the urging of the spring 142 and holds the catch 100, as illustrated in FIGURE 1. When the catch 100 is in this position, the lower end of the latch member 82 abuts against the forward edge of the linkage 110 and is pivoted clockwise out of the path of travel of the latch pin 80.

As may be seen from the above discussion, latching and unlatching of the carriage assembly occur only in the "home" position of the carriage 38 assembly. As described previously, the latch pin 80 has zero velocity at the right end of its travel, corresponding to the "home" position of the carriage 38. For these reasons, latching and unlatching occur at minimum input drive, thereby reducing wear and shock on the feed mechanism to a minimum. Inertia of the stop-start components also is a minimum. A further advantageous feature of the feed mechanism is that the carriage 38 assembly is never disengaged from the input drive during a feed cycle, regardless of the time of the termination of an energizing signal with respect to the input drive cycle. Neither is it disengaged in the event of drive power failure. The aforementioned engagement-disengagement feature permits programming of the signals applied to the solenoid 122.

What is claimed is:

1. The combination comprising: a movable feed device having a home position and being constrained to move rectilinearly; a latch pin; means for driving said latch pin along a curvilinear path between a first position, corresponding to said home position, and a second position, said latch pin having a first surface portion facing in the direction of said home position and a second surface portion facing in the direction of said second position; a translator for translating the curvilinear movement of said latch pin into rectilinear movement of said feed device, said translator including a latch pivotally mounted on said feed device and having a hook-shaped portion for engaging said second surface portion of said latch pin, and means mounted on said feed device for contacting said first surface portion when said latch pin moves toward said first position; bias means urging said latch into a pin engaging position; a holding member for engaging and holding said feed device in said home position and pivoting said latch out of said pin engaging position; and means for selectively moving said holding member out of engagement with said feed device and said latch.

2. A selectively operable feed mechanism comprising, in combination: a movable carriage constrained to move rectilinearly and having a home position; a pivot pin fixed in space; a drive link pivotally mounted on said pivot pin; a latch pin projecting from said drive link and being constrained to move along a curvilinear path; means imparting oscillatory motion to said drive link; a latch member pivotally mounted on said carriage and having means for engaging a first surface portion of said latch pin; bias means urging said latch member into a latch pin engaging position; separate means mounted on said carriage for contacting a second, opposed surface portion of said latch pin, said latch member and said separate means operating to translate the curvilinear movement of said latch pin into rectilinear movement of said carriage; means for engaging and holding said carriage in said home position and for pivoting said latch member out of said latch pin engaging position; and means selectively operable to disengage said holding and pivoting means from said carriage and said latch member.

3. The feed mechanism as claimed in claim 2 including a picker knife attached to said carriage.

4. A selectively operable feed mechanism comprising, in combination: a movable carriage constrained to move rectilinearly and having a home position; a pivot pin fixed in space; a single drive link pivotally mounted near one of its ends on said pivot pin; a latch pin projecting directly from said drive link at a point near the other end thereof and being constrained to move along an arcuate path; means imparting oscillatory motion to said drive link; means on said carriage for converting the curvilinear motion of said latch pin into rectilinear movement of said carriage, said means including a latch member pivotally mounted on said carriage and having a portion for engaging a first surface portion of said latch pin, and means pivotally mounted on said carriage and being separate from and movable independently of said latch member for engaging a second, opposed surface portion of said latch pin; bias means urging said latch member into a latch pin engaging position; a catch projecting from said carriage; a pivotally mounted carriage latch for engaging said catch in said home position of said carriage and having means movable therewith for pivoting said latch member out of said latch pin engaging position; and means selectively operable to move said carriage latch out of engagement with said catch and said latch member.

5. A selectively operable feed mechanism comprising, in combination: a movable carriage having a home position; guide means limiting said carriage to rectilinear motion; a simple drive link having a pivoted end; a latch pin projecting directly from said drive link at a point away from said pivoted end and being constrained to move along an arcuate path; means imparting oscillatory motion to said drive link; a translator for translating the curvilinear motion of said latch pin into rectilinear drive for said carriage, said translator including a latch member pivotally mounted on said carriage and having a hook-shaped end for engaging a first surface portion of said latch pin, and a member pivotally mounted on said carriage and being movable independently of said latch member for engaging a second, opposed portion of said latch pin; bias means urging said latch member into a latch pin engaging position; a catch mounted on said carriage; a carriage latch for engaging said catch in said home position of said carriage and for simultaneously pivoting said latch member out of said latch pin engaging position; and means selectively operable to move said carriage latch out of engagement with said catch and said latch member.

6. The combination comprising: a rectilinearly movable feed device having a home position; a latch pin; means for continuously moving said latch pin back and forth along an arcuate path between a first position, corresponding to said home position, and a second position; a latch means pivotally mounted on said feed device for engaging a surface portion of said latch pin which faces said second position; separate means pivotally mounted on said feed device for engaging a surface portion of said latch pin which faces said first position, said latch means and said separate means being independently movable to translate the curvilinear motion of said latch pin into rectilinear drive for said feed device; first bias means urging said latch means into a pin engaging position; a pivotable linkage for engaging and holding said feed device in said home position and for pivoting said latch means out of said pin engaging position; second bias means urging said linkage into position for engaging said feed device and pivoting said latch means; and a solenoid having a plunger connected to said linkage for pivoting said linkage out of engagement with said feed device and said latch means when said solenoid is in the energized condition.

7. In combination with a card hopper storing stacked record cards, apparatus for feeding said cards selectively comprising: a table positioned beneath said hopper and having a cutout portion; a carriage movable rectilinearly beneath said table and having a home position; a picker knife attached to said carriage and projecting through said cutout portion; a pair of rollers adjacent said table for engaging cards fed from said hopper; a drive arm having a pivoted end; a pin projecting from said arm, being constrained to move along an arcuate path, and having a first surface portion facing in the direction of said home position and a second, opposite surface portion; means imparting oscillatory motion to said drive arm; a translator for translating the curvilinear motion of said pin into rectilinear movement of said carriage comprising latch means pivotally mounted on said carriage for engaging said second surface portion of said pin, and a separate member pivotally mounted on said carriage for engaging said first surface portion of said pin; bias means urging said latch means into a pin engaging position; a catch projection from said carriage; a carriage latch for engaging said catch in said home position and having means for simultaneously engaging and pivoting said latch means out of said pin engaging position; and means selectively operable to move said carriage latch out of engagement with said catch and said latch means.

8. The apparatus as claimed in claim 7 wherein said means imparting oscillatory motion comprises a crank link connected to said drive arm, a crank shaft connected to said crank link, and a motor for driving said crank shaft.

References Cited by the Examiner
UNITED STATES PATENTS 3,010,716 11/1961 Hirst et al. _____ 271—44
3,020,044 2/1962 Hillen et al. _____ 271—44

ROBERT B. REEVES, *Primary Examiner.*

M. HENSON WOOD, Jr., *Examiner.*